G. BUNCH.
Stocks for Drilling or Tapping Instruments.
No. 139,042. Patented May 20, 1873.
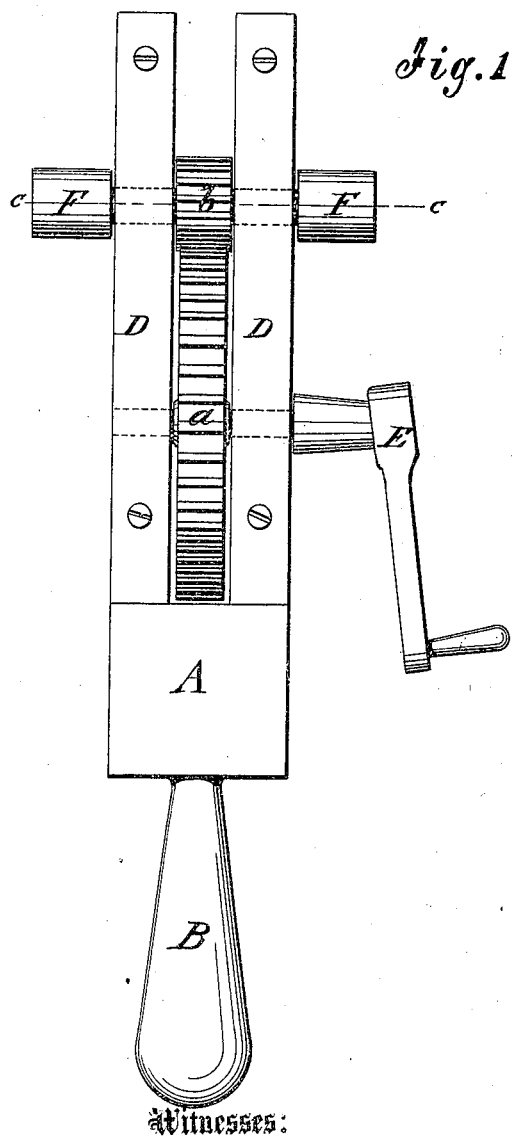
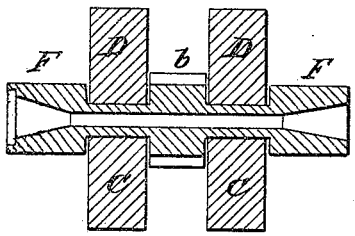
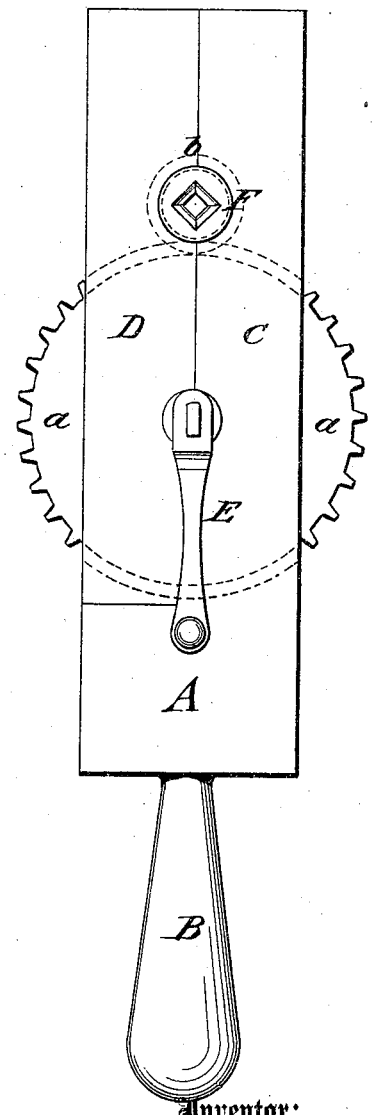
Witnesses:
A. Beynerkendorf
C. Sedgwick
Inventor:
G. Bunch
Per Munn & Co.
Attorneys.

UNITED STATES PATENT OFFICE.

GEORGE BUNCH, OF BONNOT'S MILL, MISSOURI.

IMPROVEMENT IN STOCKS FOR DRILLING OR TAPPING INSTRUMENTS.

Specification forming part of Letters Patent No. 139,042, dated May 20, 1873; application filed March 8, 1873.

*To all whom it may concern:*

Be it known that I, GEORGE BUNCH, of Bonnot's Mill, in the county of Osage and State of Missouri, have invented a new and Improved Machine for Loosening and Tightening Nuts, and Threading Bolts and Nuts, of which the following is a specification.

Figure 1 is a front view of my invention; Fig. 2, a side view of the same; and Fig. 3, a horizontal transverse section on line $cc$, Fig. 1.

Similar letters of reference indicate corresponding parts.

The object of my invention is to furnish a convenient device by which nuts may be rigidly placed on and taken off the bolts; also for the purpose of threading nuts and bolts, and for similar purposes. My invention consists of a forked-handle frame, having applied between its prongs a cog-wheel set in motion by a crank, and meshing into a pinion placed on a hollow cylindrical shaft, with two projecting trunnion-heads which are applied to the nuts; or, by insertion in dies, thread the nuts or bolts. By setting the crank in motion in the direction required the nuts may be loosened or tightened, or the bolts or nuts threaded.

In the drawing, A is the frame of the instrument, of suitable material, and consisting of a handle, B, and parallel prongs C. Connected with the latter by screws or otherwise, and forming part of them, are pieces D, which, being detachable, serve to support the shafts of the different parts and their replacement, if necessary. Crank E has the cog-wheel $a$ keyed on its shaft, between the prongs C of frame A, and imparts the motion to the same. Wheel $a$ gears into pinion $b$, keyed firmly on hollow shaft of trunnions F, projecting outside of prongs C.

The hollow trunnions F are fitted in such a manner that suitable recesses for the admission of the nuts and dies are provided therein. By placing one trunnion F on the nut and turning the crank in a forward direction, the nut is rapidly screwed on the bolt, and vice versa. A special application may be made to put on and take off the nuts of fish-joints of railroad tracks. By placing a die into trunnion F bolts may readily be threaded by the forward motion of crank E. By introducing a tap and reversing the motion, nuts may quickly be threaded.

Other similar applications of this instrument may be made, resulting in a considerable saving of time and labor.

Having thus described my invention, I claim as new and desire to secure by Letters Patent—

1. The double-socketed trunnion F, arranged to rotate in a frame, as and for the purpose specified.

2. The trunnions F, in combination with pinion $b$, cog-wheel $a$, crank E, prongs C, and pieces D of frame A, for the purpose of loosening and tightening nuts and threading nuts and bolts, substantially as described.

GEORGE BUNCH.

Witnesses:
P. B. McCORD,
JOHN H. GREGORY.